(12) United States Patent
Grant

(10) Patent No.: US 11,047,598 B2
(45) Date of Patent: Jun. 29, 2021

(54) SINGLE AXIS SOLAR TRACKING ASSEMBLY AND METHOD OF INSTALLING SUCH SINGLE AXIS SOLAR TRACKING ASSEMBLY

(71) Applicant: CEP-IP, Cambridge (GB)

(72) Inventor: Thomas McGregor James Grant, Cambridge (GB)

( * ) Notice: Subject to any disclaimer, the term of this patent is extended or adjusted under 35 U.S.C. 154(b) by 401 days.

(21) Appl. No.: 15/769,563

(22) PCT Filed: Oct. 21, 2016

(86) PCT No.: PCT/IB2016/001514
§ 371 (c)(1),
(2) Date: Apr. 19, 2018

(87) PCT Pub. No.: WO2017/068413
PCT Pub. Date: Apr. 27, 2017

(65) Prior Publication Data
US 2018/0306467 A1  Oct. 25, 2018

(30) Foreign Application Priority Data

Oct. 23, 2015 (GB) ..................................... 1518858

(51) Int. Cl.
*F24S 25/617* (2018.01)
*F24S 25/65* (2018.01)
(Continued)

(52) U.S. Cl.
CPC ............. *F24S 25/617* (2018.05); *F24S 25/65* (2018.05); *F24S 30/425* (2018.05); *H02S 20/32* (2014.12);
(Continued)

(58) Field of Classification Search
CPC .......... H02S 20/32; H02S 10/40; H02S 30/20; H02S 40/22; H01L 31/02; H01L 31/18
(Continued)

(56) References Cited

U.S. PATENT DOCUMENTS 6,010,096 A * 1/2000 Baghdasarian ........ B64G 1/443
244/172.6
9,120,583 B1 * 9/2015 Spence ................... H02S 30/20
(Continued)

FOREIGN PATENT DOCUMENTS

| CN | 203491963 | 3/2014 |
|---|---|---|
| DE | 102008010314 | 8/2009 |
| DE | 102010041128 | 3/2012 |

OTHER PUBLICATIONS

International Search Report and Written Opinion issued for PCT/IB2016/001514.

*Primary Examiner* — Niki Bakhtiari
(74) *Attorney, Agent, or Firm* — Eugenio J. Torres-Oyola; Victor M. Rodriguez-Reyes; Rafael Rodriguez-Muriel

(57) ABSTRACT

The single axis solar tracking assembly comprises a plurality of spine sections (2) connected to one another by universal joints (10), supporting legs (3) rotatably supporting the spine sections (2) on the ground, a plurality of brackets attached to each spine section (2), a plurality of rib members (4) connected to the brackets, and solar panels (5) secured to the rib members (4). The rib members (4) are moveable between a folded position and a deployed position. An auxiliary shaft is located between adjacent universal joints (10) connected to adjacent spine sections (2). First and second crossed spine hinge axes of the universal joints are arranged so that the spine sections (2) can be fold at right angles to the auxiliary shaft and the spine sections (2) can be fold in a zig zag
(Continued)

fashion into a compact storage position in which the solar panels are arranged in adjacent parallel planes.

20 Claims, 12 Drawing Sheets

(51) Int. Cl.
    *H02S 20/32*         (2014.01)
    *H02S 30/20*         (2014.01)
    *F24S 30/425*       (2018.01)
    *F24S 25/00*         (2018.01)
    *F24S 30/00*         (2018.01)
(52) U.S. Cl.
    CPC ......... *H02S 30/20* (2014.12); *F24S 2025/012* (2018.05); *F24S 2025/014* (2018.05); *F24S 2030/16* (2018.05); *Y02E 10/47* (2013.01)
(58) Field of Classification Search
    USPC .................................................. 136/243–265
    See application file for complete search history.

(56) References Cited

U.S. PATENT DOCUMENTS

| | | |
|---|---|---|
| 2011/0240006 A1 | 10/2011 | Linke et al. |
| 2011/0253614 A1* | 10/2011 | Curran .................... H02S 30/20 |
| | | 210/239 |
| 2012/0313569 A1 | 12/2012 | Curran |
| 2013/0340807 A1 | 12/2013 | Gerwing et al. |
| 2014/0020731 A1 | 1/2014 | Levi et al. |

* cited by examiner

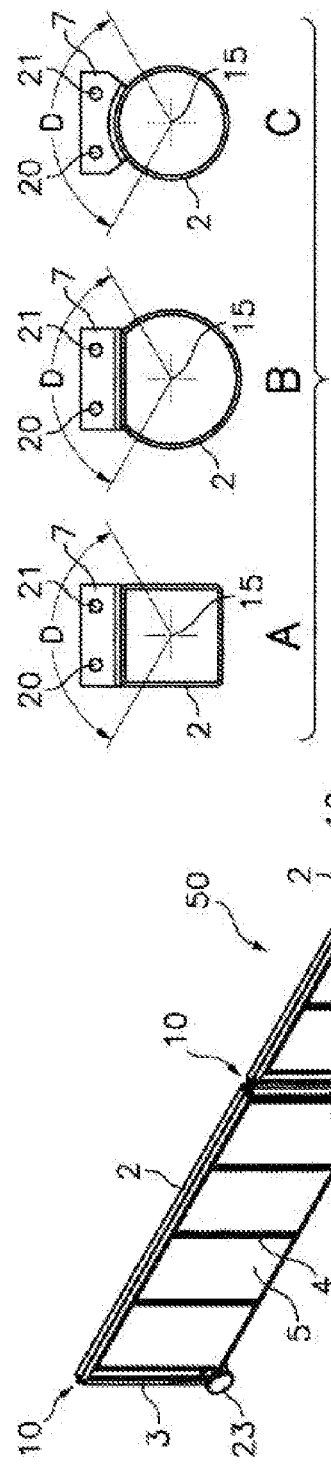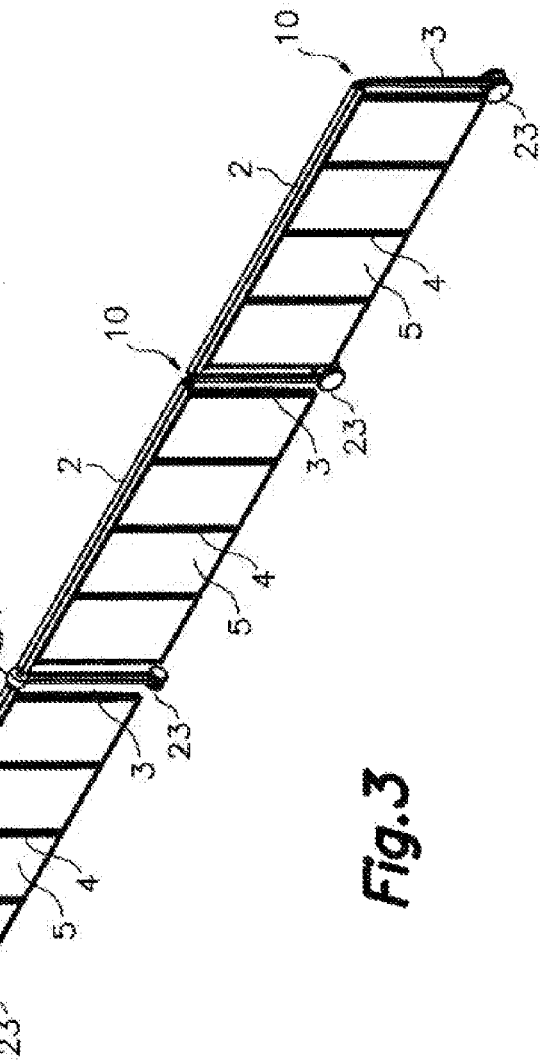

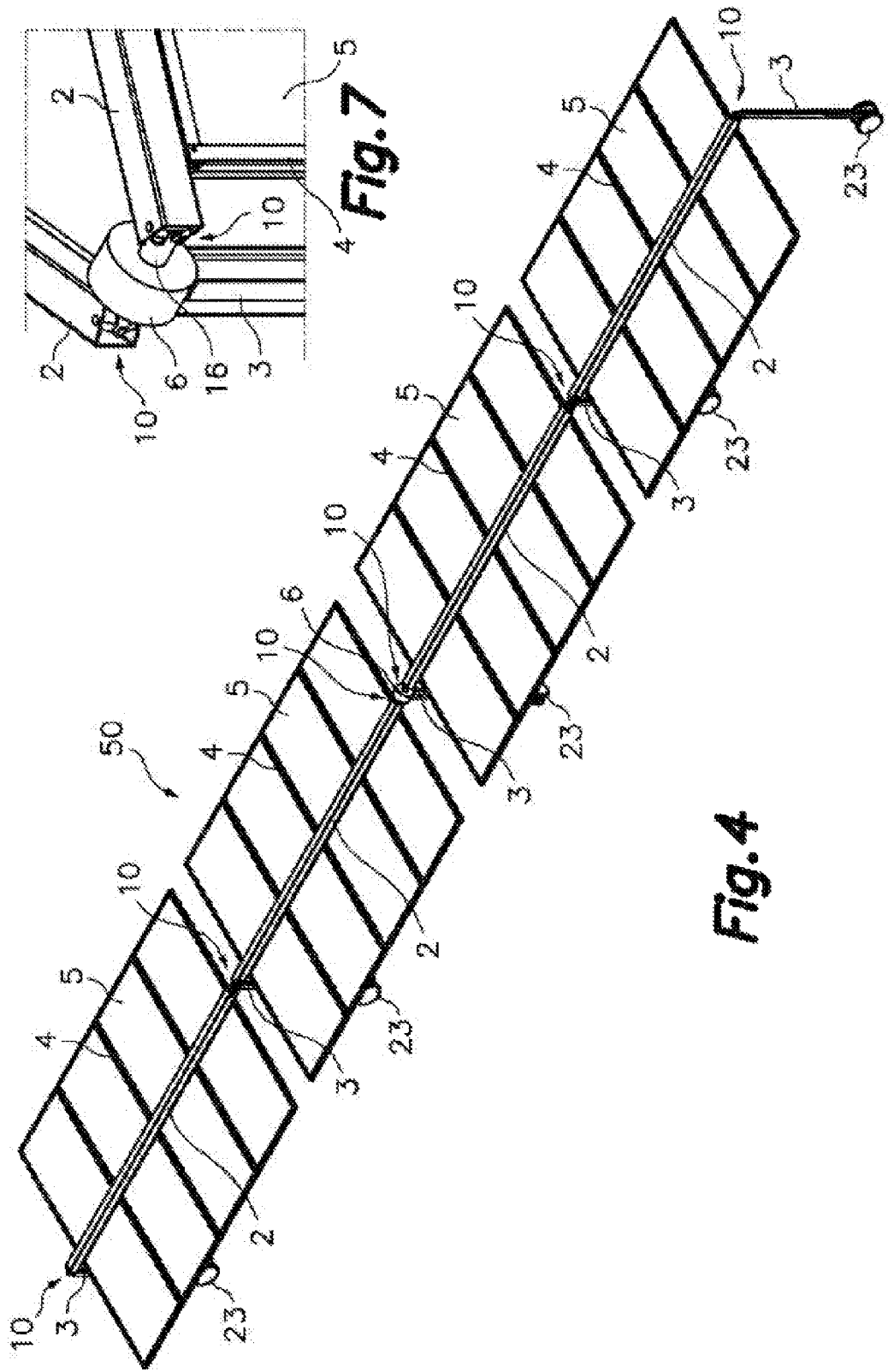

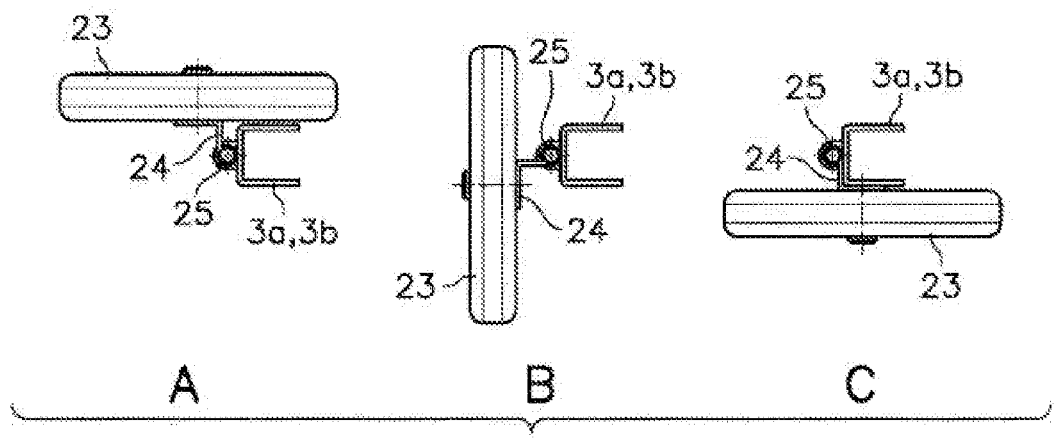
Fig.18
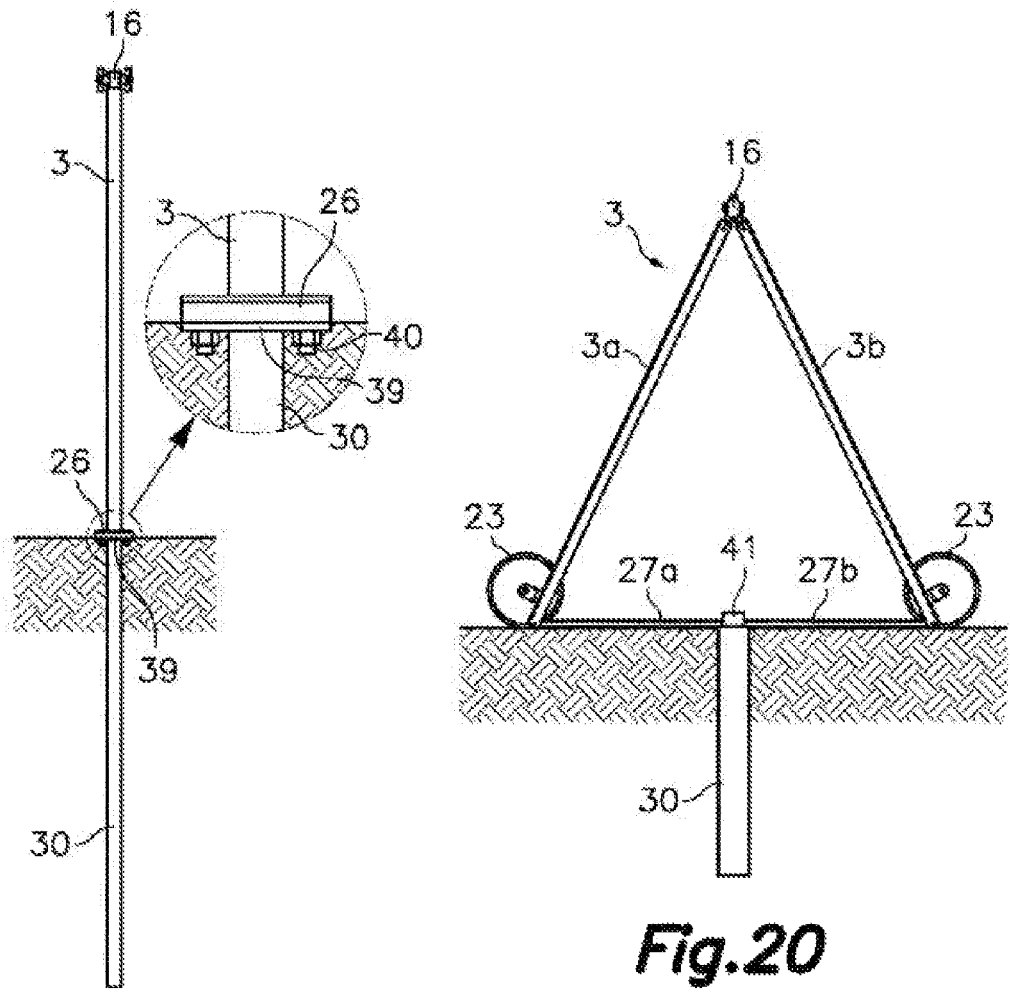
Fig.19
Fig.20

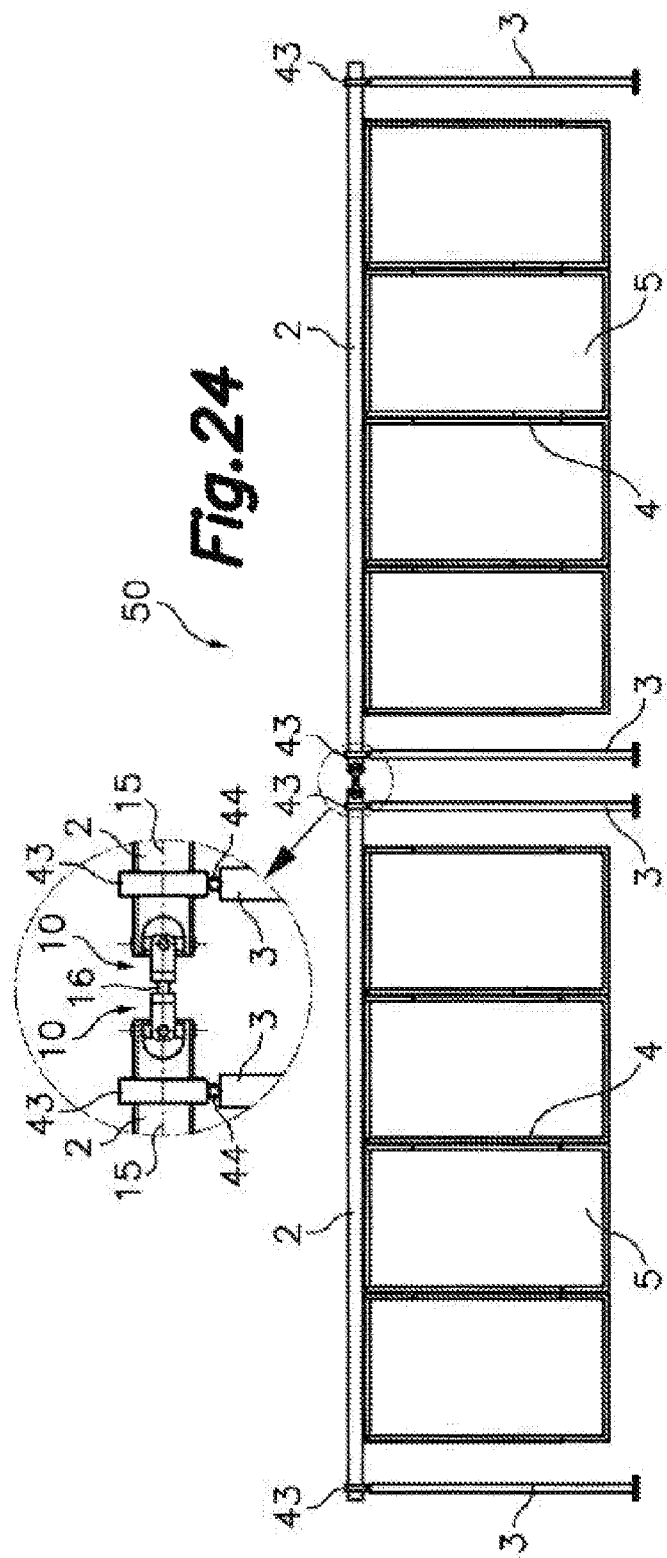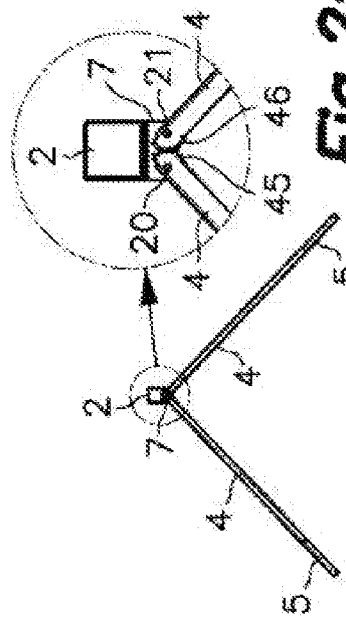

SINGLE AXIS SOLAR TRACKING ASSEMBLY AND METHOD OF INSTALLING SUCH SINGLE AXIS SOLAR TRACKING ASSEMBLY

RELATED APPLICATIONS

This application is a US national phase application of international application number PCT/IB2016/001514, filed 21 Oct. 2016, which designates the US and claims priority to Great Britain (GB) application 1518858.4 filed 23 Oct. 2015, the contents of each of which are hereby incorporated by reference as if set forth in their entireties.

TECHNICAL FIELD

The present invention relates in general to a single axis solar tracking assembly and more in particular to a solar tracking assembly which is foldable in a zig zag fashion into a compact storage position and which is deployable from the compact storage position to an operative deployed work position. The present invention also relates to a method of installing such single axis solar tracking assembly at an installation site.

BACKGROUND OF THE INVENTION

Energy for use in remote areas is expensive because of high logistical costs and increased security risks. In such remote areas with high solar radiation, solar energy presents an attractive alternative to traditional fossil fuels since it can be sourced locally. However, the logistical and security risks still exist for the solar generating equipment meaning that it is costly to get the equipment to site. Additionally, the duration for which the equipment is required is often uncertain. Having the ability to easily transport, install and re-locate the solar equipment to another site is advantageous because it reduces risks related to transport, installation and security. Furthermore, it makes it possible to extract the highest value possible from the solar equipment by providing the flexibility to spread its use across multiple operations during its lifetime.

Document US 2013/0340807 A1 discloses a solar tracking section including a spine section and a plurality of paired brackets connected to the spine section. The brackets are positioned on opposite sides of the spine section and at least one of the paired brackets includes wheels to allow rolling movement of the spine section. A rib element is attached to each bracket and is moveable from a shipping position to a work position. At least one solar panel is secured to each rib element. A plurality of such solar tracking sections are assembled in an offsite location in a secondary automated process. Then a plurality of the separated solar tracking sections are loaded in the shipping position on a truck and transported to a deployment site where the solar tracking sections are unloaded from the truck. Finally, the solar tracking sections are arranged with their spine sections mutually aligned, the spine sections are connected to one another by universal joints to form a spine, the spine is rotatably supported on the ground by supporting legs, and the solar panels are moved from the shipping position to the work position to form a solar tracking assembly. One of the supporting legs located between adjacent ends of adjacent spine sections supports an electric motor having an output shaft protruding from opposite sides thereof. Both ends of the output shaft of the electric motor are connected to the adjacent spine sections by universal joints.

A drawback of the solar tracking assembly described in cited document US 2013/0340807 A1 is that the universal joints connecting the spine sections are not arranged for permitting to fold the solar tracking assembly into a compact storage position but on the contrary the spine sections of the different solar tracking sections need to be disconnected from one another and the supporting legs need to be dismounted for storage and shipping.

Another drawback of the solar tracking assembly described in cited document US 2013/0340807 A1 is that the brackets which connect the ribs to the spine are necessarily positioned on opposite sides of the spine which increases the width of the tracker and therefore the distance required between trackers so as to avoid shading effects of one tracker on another in multiple tracker installations. This is especially impactful as the width of a single axis tracker is generally in the east-west direction which is also the direction in which the longest shadows are cast.

Yet another drawback of the solar tracking assembly described in cited document US 2013/0340807 A1 is that it requires the on-site mounting of the spine assembly upon the supporting legs. This is likely to require the use of specific lifting means, for example a crane, to assemble the spine assemblies to the supporting legs.

Document CN 203491963 U discloses a deployable solar tracking assembly comprising a plurality of solar panels hinged to one another by mutually parallel hinges so that the solar panels can be folded in a zig zag fashion into a storage compact position in which the solar panels are arranged in adjacent parallel planes, and can be deployed into a work position in which the solar panels are mutually coplanar. However, this deployable solar tracking assembly does not have a foldable spine providing, in the work position, a rotation axis about which an electric motor can rotate the solar panels to follow the daily motion of the sun.

DISCLOSURE OF THE INVENTION

The present invention addresses the issue of providing electrical energy in remote areas by providing, according to a first aspect of the invention, a single axis solar tracking assembly comprising a spine having a plurality of spine sections connected to one another by universal joints. The spine sections have a longitudinal rotation axis and are rotatably supported on the ground by supporting legs. A plurality of brackets are attached to each of the spine sections, a plurality of rib members are connected to the brackets, and one or more solar panels are secured to each of the rib members. The solar panels have a planar solar energy collecting surface. The rib members together with the solar panels are moveable with respect to the spine sections between a folded position and a deployed position. An auxiliary shaft is located between adjacent universal joints connected to adjacent ends of two spine sections. Each of the universal joints comprises a cross member defining perpendicularly crossed first and second spine hinge axes, a first yoke rigidly attached to one end of one of the spine sections and connected to the cross member to rotate about the first spine hinge axis, and a second yoke rigidly attached to one end of the auxiliary shaft and connected to the cross member to rotate about the second spine hinge axis.

In the single axis solar tracking assembly of the present invention, one of the first and second spine hinge axes defined by the cross member of each universal joint is parallel and the other is perpendicular to the solar energy collecting surfaces of the solar panels when the solar tracking assembly is in an intermediate position in which the rib members together with the solar panels are in the folded position and said longitudinal rotation axis of the spine section is aligned or near to aligned with the auxiliary shaft. This allows each spine section to be folded at right angles with respect to the auxiliary shaft and the plurality of spine sections to be folded in a zig zag fashion from said intermediate position into a compact storage position in which the solar radiation collecting surfaces of the solar panels are arranged in adjacent parallel planes.

With this construction, all components of the single axis solar tracking assembly are assembled both in a deployed work position and in the compact storage position, and there is no need for mounting additional components when the single axis solar tracking assembly is deployed from the compact storage position to the deployed work position. Optionally, locking means are provided for locking one or more of the universal joints in the compact storage position. For example, these locking means comprise a locking pin that impedes rotation of at least one of the first and second yokes about the corresponding first or second spine hinge axis defined by the cross member.

In a preferred embodiment, one of the auxiliary shafts is operatively connected to an electric motor, so that the electric motor makes the auxiliary shaft together with all the spine sections rotate.

In one embodiment, one or more of the supporting legs are located between adjacent ends of each two adjacent spine sections, and one of the auxiliary shafts is rotatably supported on each of the supporting legs which are located between adjacent ends of two adjacent spine sections. In such case, the electric motor is secured to one of the supporting legs which is located between adjacent ends of two adjacent spine sections and the auxiliary shaft is an output shaft of the electric motor protruding from opposite sides thereof.

In any case, the electric motor can be typically controlled by a control system including computer means running a control program optionally in cooperation with sensors to rotate the spine sections and the solar panels so as to follow the daily motion of the sun. The solar panels are preferably photovoltaic solar panels.

In another embodiment, a bearing is supported by at least one of said supporting legs, and one end of one of the spine sections is rotatably supported by the bearing. A tilt hinge providing a tilting axis perpendicular to the longitudinal rotation axis of the spine section is provided between the bearing and the supporting legs.

In an embodiment, the spine sections have a support surface encompassed in a dihedral angle of 120 degrees or less with respect to said longitudinal rotation axis of the spine section, and the brackets are located on said support surface. The support surface of the spine sections is preferably a flat support surface. In the folded position, in which the spine sections are in a horizontal or near to horizontal position supported at both ends thereof by the supporting legs, the support surface of the spine sections is facing downwards and the rib members together with the solar panels are hanging vertically by gravity from the brackets.

In an embodiment, pairs of opposing rib members are connected to the brackets by means of two adjacent longitudinal hinges parallel to the longitudinal rotation axis of the spine section, and pairs of solar panels are respectively secured to the pairs of opposing rib members. The pairs of solar panels are adjacent and facing to each other in the folded position and are mutually coplanar extending from opposite sides of the spine section in the deployed position. In the deployed position, the rib members are locked with respect to the spine sections by locking means comprising, for example, truss members, clamp elements or locking pins. Preferably, locking means are also provided for locking the rib members in the folded position.

In another embodiment, single rib members are connected to the brackets by rotating and sliding means comprising a guide element provided in the rib member parallel thereto and a guide follower connected to the bracket by a single longitudinal hinge parallel to the longitudinal rotation axis of the spine section. Single solar panels are secured to the single rib members. The single solar panels are completely off set with respect to the spine section in the folded position and are centred with respect to the spine section in the deployed position. In the deployed position, the single rib members are locked to the spine section by locking means comprising, for example, clamp elements or locking pins. Preferably, locking means are also provided for locking the single rib members in the folded position.

In an embodiment, one or more of the supporting legs comprise a single post, and a friction reducing element is optionally provided at a lower end of the single post. The friction reducing element can be, for example, a wheel or a sled. Optionally, in the case of using a wheel, the wheel is rotatably mounted on a movable support, and the movable support is connected to the single post by a hinge parallel to a longitudinal direction of the single post. Thus, the wheel can be freely self-oriented. Alternatively, a transverse base is attached to a lower end of the single post, so that the transverse base extends perpendicular to the single post from opposite sides thereof. Optionally, the transverse base comprises two foldable transverse base members hinged to the single post so that the two foldable transverse base elements can be folded to a position parallel and adjacent to the single post.

In another embodiment, one or more of the supporting legs comprises two leg members hinged to one another at their upper ends and two base members having respective adjacent ends hinged to one another and respective opposite ends hinged to lower ends of the two leg members, thus constituting a foldable triangle which can moved between folded and unfolded positions. The base of the foldable triangle is oriented perpendicular or near to perpendicular to the spine sections. Preferably, locking means are provided to lock the leg members and base members in the folded position. Optionally, dampening means are provided to control the speed at which the leg members and base members of the supporting leg transitions from the folded position to the unfolded position. These dampening means are located, for example, at least one of the hinges of the supporting leg.

Friction reducing elements are optionally provided at lower ends of the two leg members. The friction reducing elements can be, for example, wheels or sleds. Optionally, in the case of using wheels, the wheels are rotatably mounted on respective movable supports, and each of the movable supports is connected to one of the two leg members by a hinge parallel to a longitudinal direction of the leg member. Thus, the wheels can be freely self-oriented.

Whatever the embodiment of the supporting legs used, in the deployed work position the supporting legs are anchored to the ground by anchoring means. These anchoring means can include, for example, counterweights, ground pilots, guy wires, concrete footings, ballast blocks, or combinations thereof. Also locking means are optionally provided for preventing the supporting legs from rotating with respect to the auxiliary shaft or with respect to the longitudinal rotation axis of the spine section.

According to a second aspect, the present invention provides a method for installing the single axis solar tracking assembly of the first aspect of the invention. The method comprises having stored the single axis solar tracking assembly folded in the compact storage position in which the plurality of spine sections are folded in a zig zag fashion and the solar panels are arranged in adjacent and mutually parallel planes, transporting the single axis solar tracking assembly folded in the compact storage position to an installation site, deploying the single axis solar tracking assembly from the compact storage position to an intermediate position in which the plurality of spine sections are mutually aligned or near to aligned and the rib members together with the solar panels are in the folded position, anchoring the supporting legs to the ground, deploying the rib members together with the solar panels to the deployed position, in which the plurality of spine sections are mutually aligned or near to aligned and the solar panels are mutually coplanar or near to coplanar, and rotating the spine sections together with the rib members and the solar panels in the deployed position to a work position in which the solar panels are positioned to receive solar radiation.

Advantages

The single axis solar tracking assembly and the method for installing it according to the present invention have a number of advantages.

Flexible utility scale: The single axis solar tracking assembly is optimised for large scale installations, especially when they are remote. Firstly, placing the connection bracket on one side of the spine minimizes the width of the tracker and therefore allows adjacent trackers to be placed closer in the east-west direction without compromising yield when compared to a larger tracker with the same number of solar panels. Secondly, the large angular amplitude of the universal joint required to enable a compact storage configuration enables the tracker to easily follow the contours of the installation site while using a single motor for multiple spine sections. Thirdly, because one motor is used for each row, contiguous trackers can be positioned at different angles so that they do not shade each-other on irregular terrain, or in other words, a different back-tracking angle on each row is possible. When applied on a large scale, these three features can provide significant cost advantages.

Single axis tracker: The single axis tracking system is a good option for remote industrial sites because single axis solar tracking units can yield up to approximately 30% more than a fixed installation but only cost approximately 10% more, they require a larger area to install than a fixed structure but remote areas where electrical energy is required render this factor insignificant, they provide a yield profile (power level vs time of day) which is better adjusted to the power requirements of an industrial operation because higher power levels are reached earlier in the day, and dust does not accumulate as easily as with a fixed structure because they are in continuous movement.

Ease of maintenance: In installations with multiple rows of trackers, one slewing motor is used for each row. This allows for free circulation between tracking rows which facilitates maintenance and inspection, trackers can be programmed to face each other so that two rows can be cleaned from the same position, which is not possible with trackers with common central motors or with fixed installations, the trackers can be positioned to follow the contours of the available land without increasing cost, which is not possible with trackers with central motors.

Cost-effective to deploy and pack-up: The single axis solar tracking assembly is designed to minimise the effort required to install it and pack it up. In the compact storage position, the single axis solar tracking assembly takes a significantly reduced volume in spite of being fully assembled and it can be easily stored and shipped, for example, within a standard shipping container. When equipped with wheels or skids, the tracker can be rolled or skidded out of a shipping container and deployed without using heavy machinery and installation costs and risks are minimised because most assembly operations are carried out in a controlled factory environment where they are most cost-effective instead of at the installation site. Additionally, the design features that enable the tracking system to be easily deployed and packed-up are integrated into the tracker parts so as to minimise cost increase for the added functionality.

BRIEF DESCRIPTION OF THE DRAWINGS

The above and other features and advantages will be better understood from the following detailed description of exemplary embodiments with reference to the accompanying drawings, in which:

FIG. 3 is a perspective view of the single axis solar tracking assembly of FIG. 1 in the intermediate position between the compact storage position and the work position, in which solar panels are in a folded position;

FIG. 4 is a perspective view of the single axis solar tracking assembly of FIG. 1 in a second transition position between the intermediate position and the deployed work position, in which solar panels are in a deployed position;

FIGS. 6 A, B, C are enlarged front detail views showing different alternative configurations for spine sections belonging to the single axis solar tracking assembly of FIG. 1;

FIG. 7 is a partial perspective view of two adjacent spine section connected to one another by universal joints in cooperation with an electric motor in the first transition position;

FIGS. 18 A, B, C are top views illustrating a pivoting connection connecting a wheel to a leg member of the supporting leg of FIGS. 16 A, B, C in A) a first side position, B) an intermediate position between the first side position and a second side position, and C) the second side position;

FIG. 19 is a side view illustrating anchoring means anchoring a single post supporting leg to the ground according to an embodiment including ground pilots;

FIG. 20 is a side view illustrating anchoring means anchoring the supporting leg of FIGS. 16 A, B, C to the ground according to an embodiment including ground pilots;

FIG. 24 is a side view of a single axis solar tracking assembly according to another embodiment of the present invention in an intermediate position between the compact storage position and the deployed work position, in which solar panels are in a folded position, with an enlarged detail; and FIG. 25 is a front view illustrating the connection of rib members and solar panels to the spine section in an intermediate position between the folded position and the deployed position, with an enlarged detail.

DETAILED DESCRIPTION OF EXEMPLARY EMBODIMENTS

Figure 1:
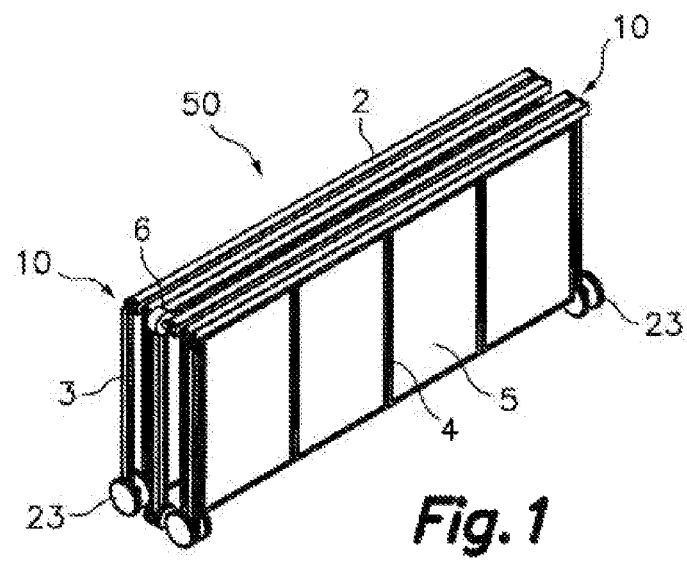
FIG. 1 is a perspective view of a single axis solar tracking assembly according to an embodiment of the present invention in a compact storage position.

Referring first to FIGS. 1 to 11, the numeric reference 50 designates in general a single axis solar tracking assembly according to an embodiment of the present invention, which comprises a spine having a plurality of spine sections 2 connected to one another by universal joints 10, and supporting legs 3 rotatably supporting the spine sections 2 on the ground. Between adjacent ends of two adjacent spine sections 2 one of the supporting legs 3 is located, and at free ends of the end spine sections 2 respective supporting legs 3 are located. In this embodiment, each of the supporting legs 3 comprises a single post provided with a friction reducing element in the form of a pair of wheels 23 at a lower end thereof, although alternatively sleds are also possible.

As better shown in FIGS. 6 A, B, C, the spine sections 2 are formed by a tubular member having a longitudinal rotation axis 15 and provided with a support surface encompassed in a dihedral angle D of 120 degrees or less with respect to the longitudinal rotation axis 15. A plurality of brackets 7 are attached to the support surface of each of the spine sections 2. The brackets 7 are distributed along the support surface, a plurality of rib members 4 are connected to the brackets 7, and a plurality of solar panels 5 are secured to the rib members 4. Each of the solar panels 5 has solar radiation collecting surface.

FIG. 6A shows one embodiment in which the tubular member constituting the spine section 2 has a square cross section, one side of which provides the mentioned support surface with a flat shape where the brackets 7 are located. FIG. 6B shows another alternative embodiment in which the tubular member constituting the spine section 2 has a round cross section having a longitudinal truncation providing the support surface also with a flat shape where the brackets 7 are located. FIG. 6C shows still another embodiment in which the tubular member constituting the spine section 2 has a completely round cross section providing the support surface with a convex shape, and in which the brackets 7 are adapted and attached to this convex support surface. As shown in FIGS. 6A-6C, each bracket has a pair of holes defining two adjacent longitudinal hinges 20, 21 parallel to the longitudinal rotation axis 15.

Figure 10:
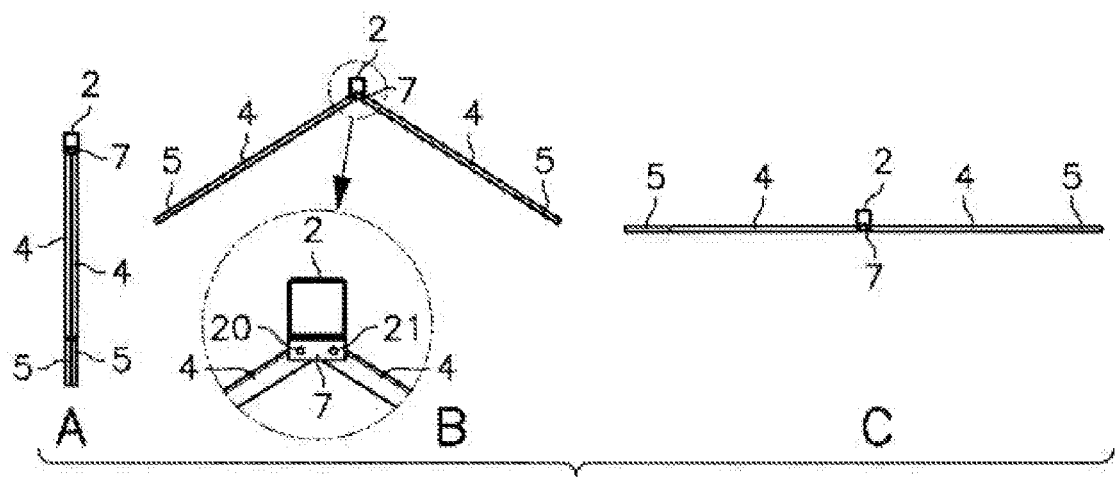
FIGS. 10 A, B, C are front views illustrating the connection of rib members and solar panels to the spine section A) in the folded position, B in an intermediate position between the folded position and the deployed position, with an enlarged detail, and C) in the deployed position, respectively, according to an embodiment.

As better shown, for example, in FIGS. 10 A, B, C, pairs of opposing rib members 4 connected to the brackets 7 by means of the two adjacent longitudinal hinges 20, 21, and the solar panels 5 are respectively secured to the pairs of opposing rib members 4. For example, two rib members 4 are connected to opposite side edges of each solar panel 5, and the rib members 4 together with the solar panels 5 are pivotable with respect to the spine sections 2 about the two longitudinal hinges 20, 21 between a folded position and a deployed position. The paired solar panels 5 are adjacent and facing to each other in the folded position (FIG. 10A) and are mutually coplanar extending from opposite sides of the spine section 2 in the deployed position (FIG. 10O).

When the spine sections 2 are supported on the ground by the supporting legs 3 and the solar panels 5 are in the folded position, the support surface of the spine sections 2 is facing downwards and the rib members 4 together with the solar panels 5 are hanging vertically by gravity from the brackets 7 with the solar radiation collecting surfaces of the paired solar panels 5 facing to each other.

FIG. 25 shows an alternative embodiment in which the rib members 4 of each pair of opposing rib members 4 are rigidly attached to mutually meshed gear elements 45, 46 that cause the opposing rib members 4 to move symmetrically with respect to the spine section 2 between the folded and deployed positions.

Figure 11:
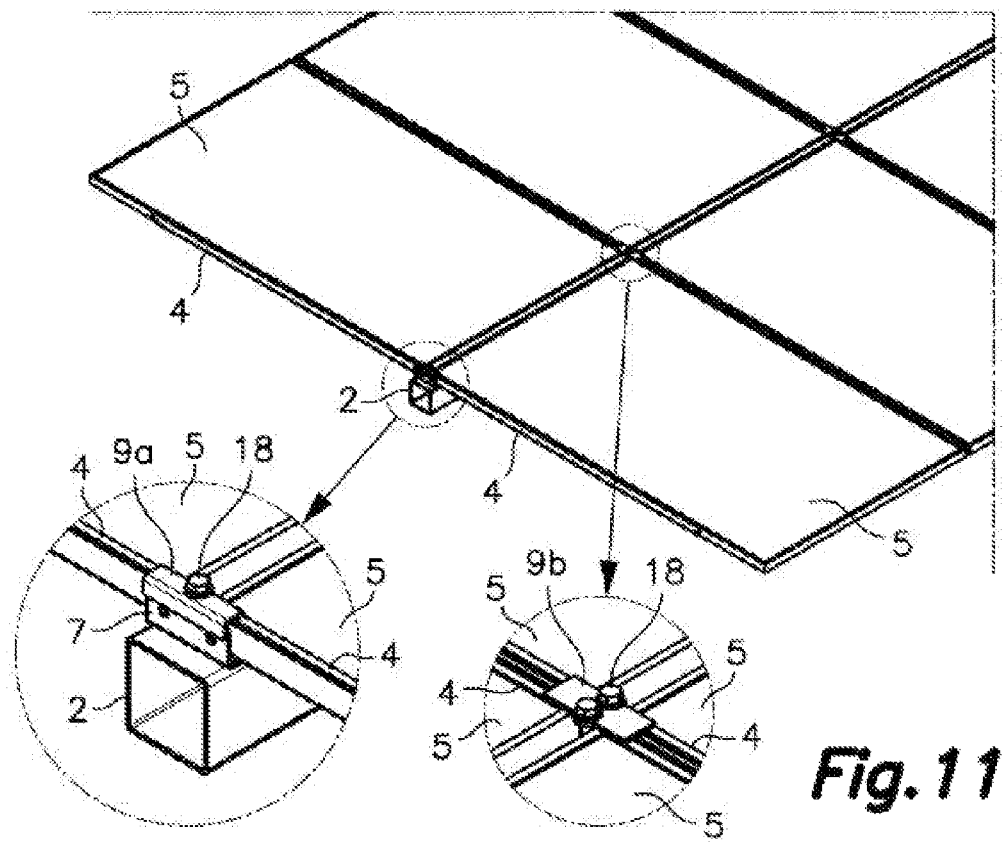
FIG. 11 is a perspective view illustrating locking means locking the rib members and solar panels to the spine section in the deployed position according to an embodiment, with enlarged details.

FIG. 11 shows locking means for locking the rib members 4 to the spine sections 2 in the deployed position. These locking means comprise clamp elements 9 *a*, 9 *b* secured to the spine section 2 by fastening elements, such as for example bolts 18. These clamp elements 9 *a*, 9 *b* press on portions of each pair of rib members 4 and lock the rib members 4 against the flat support surface of the spine section 2.

Figure 8:
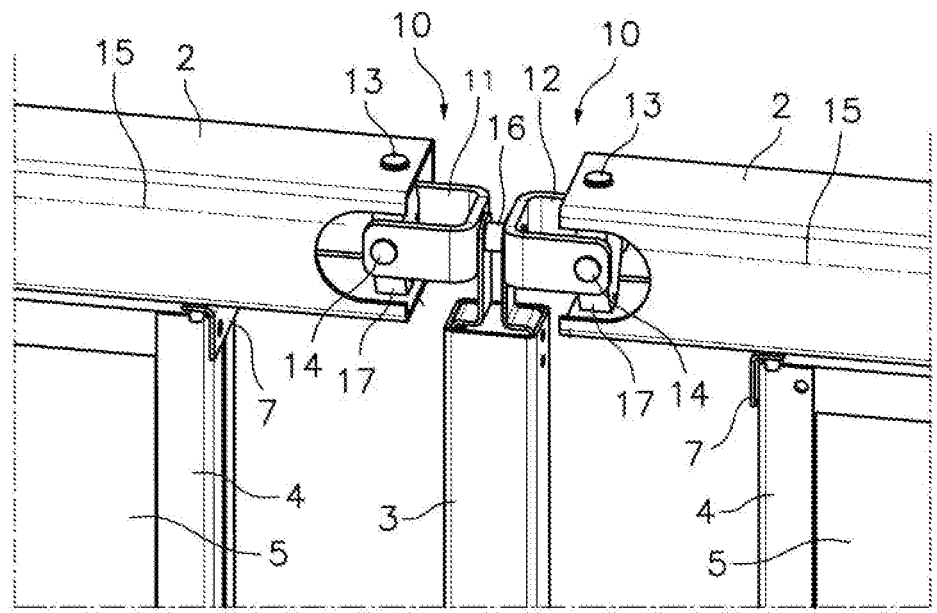
FIG. 8 is a partial perspective view of two adjacent spine section connected to one another by universal joints with the solar tracking assembly in the intermediate position.
Figure 9:
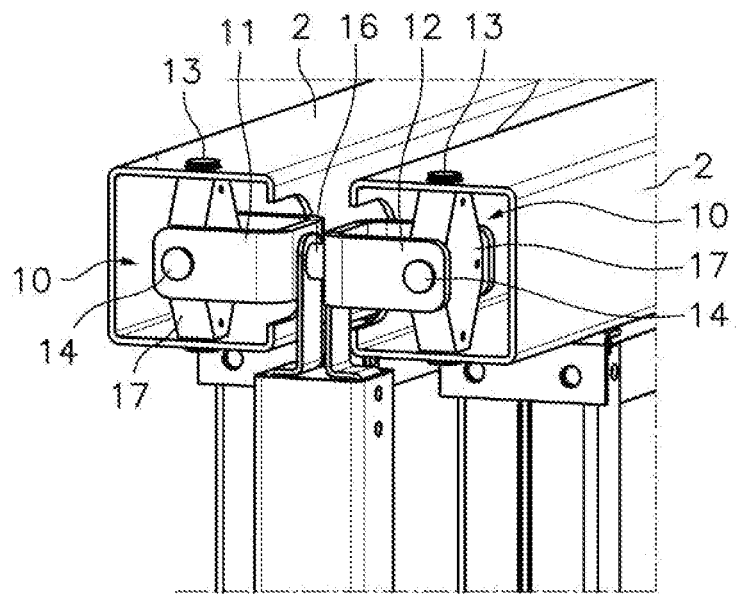
FIG. 9 is a partial perspective view of the two adjacent spine section connected to one another by universal joints of FIG. 8 with the solar tracking assembly in the compact storage position.

As shown in FIGS. 8 and 9, each of the supporting legs 3 which are located between adjacent ends of two adjacent spine sections 2 rotatably supports an auxiliary shaft 16, and opposite ends of this auxiliary shaft 16 are respectively connected to adjacent ends of the adjacent spine sections 2 by respective universal joints 10. Each of the universal joints 10 comprises a cross member 17, and first and second yokes 11, 12. The cross member 17 defines perpendicularly crossed first and second spine hinge axes 13, 14. The adjacent end of the corresponding spine section 2 is shaped so as to form the first yoke 11, which is connected to the cross member 17 to rotate about the first spine hinge axis 13. Alternatively, the first yoke 11 could be a separated part rigidly attached to the end of the spine section 2 with an equivalent result. The second yoke 12 is rigidly attached to one end of the auxiliary shaft 16 and connected to the cross member 17 to rotate about the second spine hinge axis 14.

The first spine hinge axis 13 of the cross member 17 of each universal joint 10 is parallel and the second spine hinge axis 14 is perpendicular to the solar panels 5 when the rib members 4 together with the solar panels 5 are in the folded position and when the longitudinal rotation axis 15 of the spine section 2 is aligned with the auxiliary shaft 16 (FIG. 8). This allows the spine sections 2 to be folded at right angles with respect to the auxiliary shaft 16 (FIG. 9) while the solar panels 2 are kept in the folded position.

It will be obvious to a person skilled in the art that an alternative embodiment of the present invention (not shown), wherein the first spine hinge axis 13 is perpendicular and the second spine hinge axis 14 is parallel to the solar panels 5 when the rib members 4 together with the solar panels 5 are in the folded position and when the longitudinal rotation axis 15 of the spine section 2 is aligned or near to aligned with the auxiliary shaft 16, also allows the spine sections 2 to be folded at right angles with respect to the auxiliary shaft 16 while the solar panels 2 are kept in the folded position. This inverse construction is also within the scope of the present invention.

In any case, the first and second yokes 11, 12 are shaped so as they do not interfere with each other when the spine sections 2 are folded at right angles with respect to the auxiliary shaft 16.

The free ends of the end spine sections 2 are supported by supporting legs 3, and optionally the free ends of the end spine sections 2 are connected to respective universal joints 10 which in turn are connected to respective auxiliary shafts 16 supported on corresponding supporting legs 3.

As shown in FIG. 7, an electric motor 6 is secured to an upper end of one of the supporting legs 3 and the auxiliary shaft 16 is an output shaft of the electric motor 6 protruding from opposite sides thereof. Opposite ends of the output shaft of the electric motor 6 are connected to ends of the adjacent spine sections 2 by respective universal joints 10 as previously explained with relation to FIGS. 8 and 9. Alternatively, the auxiliary shaft 16 supported on one of the supporting legs 3 cold be operatively connected to an output shaft of an electric motor by means of a movement transmission so that the auxiliary shaft is rotated by the electric motor.

FIG. 1 shows the single axis solar tracking assembly 50 of the present invention in a compact storage position in which the rib members 4 together with the solar panels 5 are arranged in the folded position with the solar radiation collecting surfaces of the solar panels 5 in adjacent parallel planes and the plurality of spine sections 2 are folded in a zig zag fashion to mutually parallel positions and supported on the ground by the supporting legs 3. Furthermore, the solar radiation collecting surfaces of the paired solar panels are facing to each other. In this compact storage position the single axis solar tracking assembly 50 takes a significantly reduced volume in spite of being fully assembled and it can be easily stored and shipped.

Figure 2:
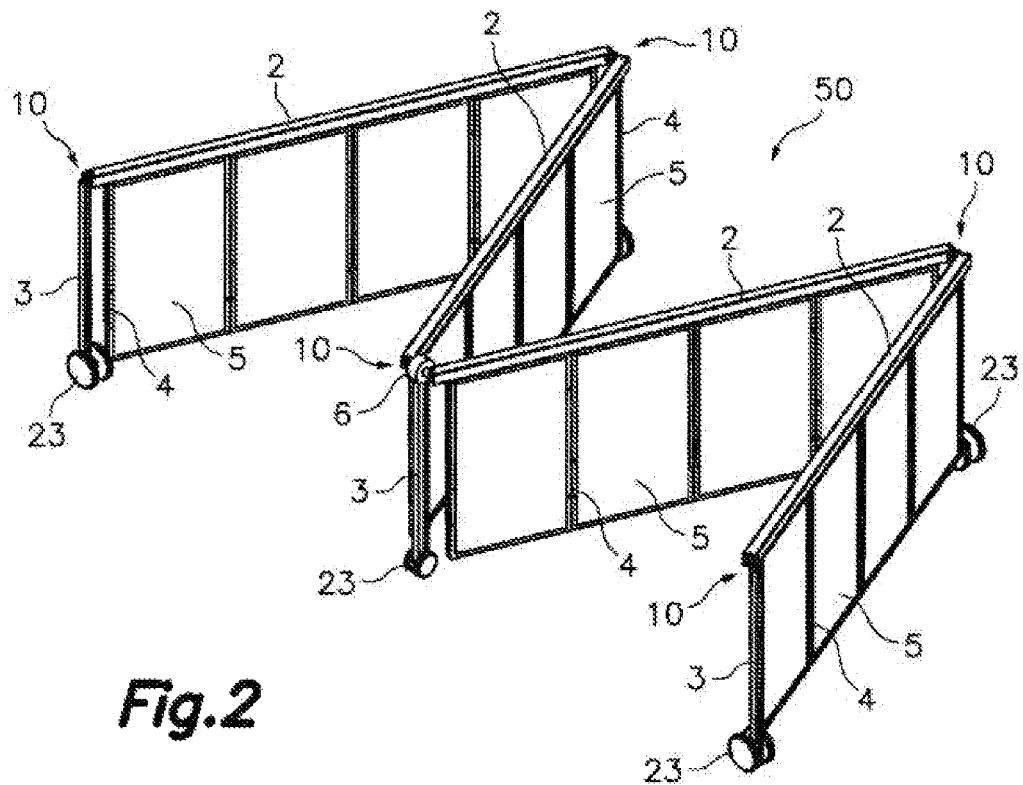
FIG. 2 is a perspective view of the single axis solar tracking assembly of FIG. 1 in a first transition position between the compact storage position and an intermediate position.

FIG. 2 shows the single axis solar tracking assembly 50 in a first transition position in which the plurality of spine sections 2 are partially unfolded in a zig zag fashion while they are still supported on the ground by the supporting legs 3 and while the rib members 4 together with the solar panels 5 remain in the folded position. The wheels 23 at lower ends of the supporting legs 3 facilitate the deployment.

FIG. 3 shows the single axis solar tracking assembly 50 in an intermediate position in which the plurality of spine sections 2 are mutually aligned and still supported on the ground by the supporting legs 3 and the rib members 4 together with the solar panels 5 remain still in the folded position. At this stage, the supporting legs 3 are anchored to the ground as will be explained below.

FIG. 4 shows the single axis solar tracking assembly 50 in a second transition position in which the plurality of spine sections 2 remain mutually aligned and supported on the ground by the supporting legs 3 anchored to the ground and the rib members 4 together with the solar panels 5 have been moved and locked to the deployed position. At this stage, the solar panels 5 are deployed but their solar radiation collecting surfaces are facing downwards.

Figure 5:
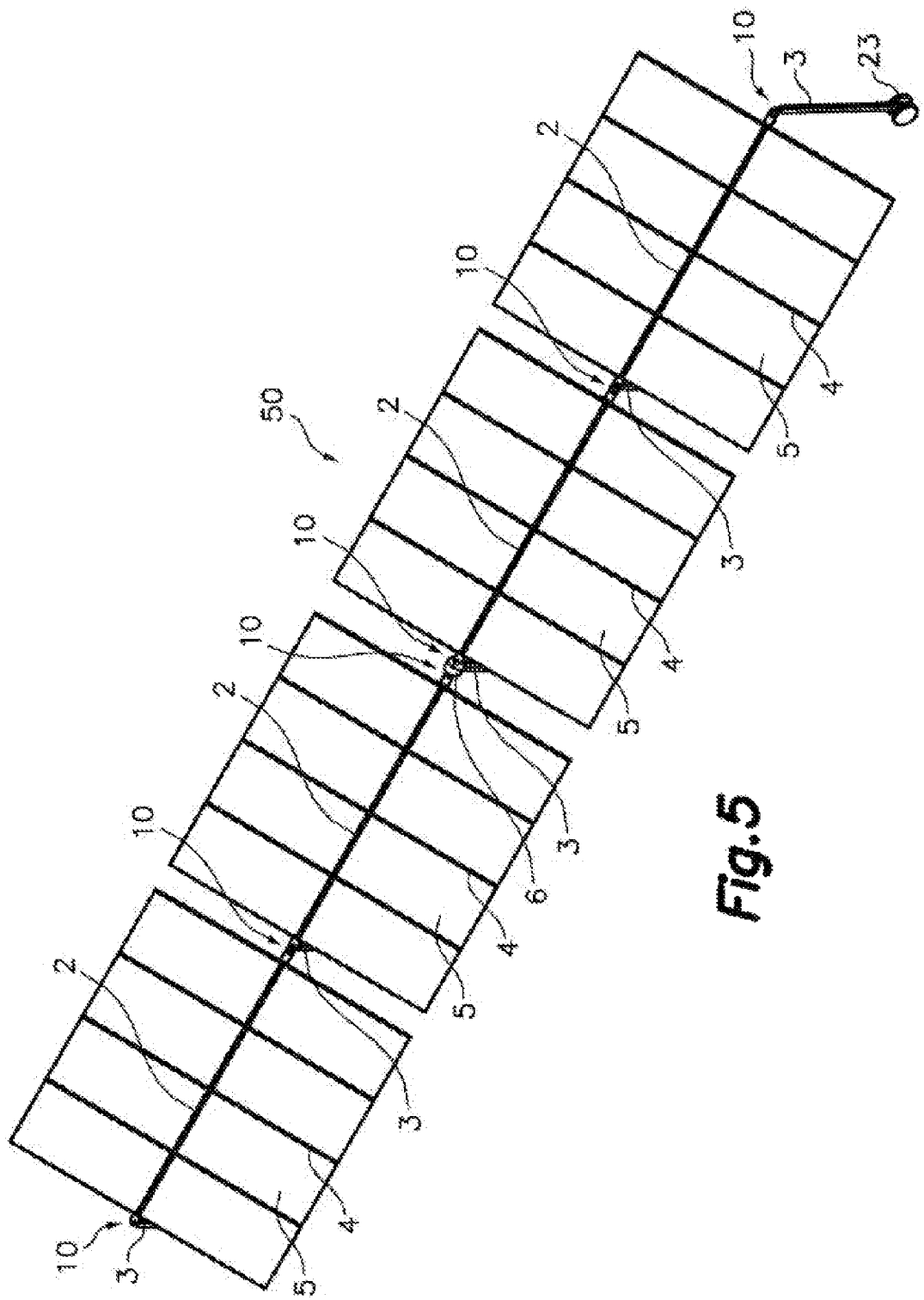
FIG. 5 is a perspective view of the single axis solar tracking assembly of FIG. 1 in the deployed work position.

FIG. 5 shows the single axis solar tracking assembly 50 in a deployed work position in which the plurality of spine sections 2 are mutually aligned and supported on the ground by the supporting legs 3 anchored to the ground, are in the deployed position, and the spine sections 2 together with the rib members 4 and the solar panels 5 in the deployed position have been rotated face up to a position convenient to receive solar radiation on their solar radiation collecting surfaces. At this stage, the electric motor 6 is arranged for rotating the spine sections 2 together with the rib members 4 and the solar panels 5 so as to follow the daily motion of the sun.

FIG. 24 shows an alternative embodiment in which a bearing 43 is supported by each of the supporting legs 3, and opposite ends of the spine sections 2 are supported by the bearing 43 so that the spine sections 2 can freely rotate about their respective longitudinal rotation axes 15. The adjacent ends of each two adjacent spine section 2 are connected to one another by the two universal joints 10 in cooperation with the intermediate auxiliary shaft 16 in a similar way than previously explained in connection to FIGS. 8 and 9. A tilt hinge 44 is provided between each of the bearings 43 and the corresponding supporting leg 3. The tilt hinge 44 provides a tilting axis perpendicular to the longitudinal rotation axis 15 of the spine section 2 that enables to install the single axis solar tracking assembly on an inclined ground while keeping the supporting legs 3 upright.

Figure 12:
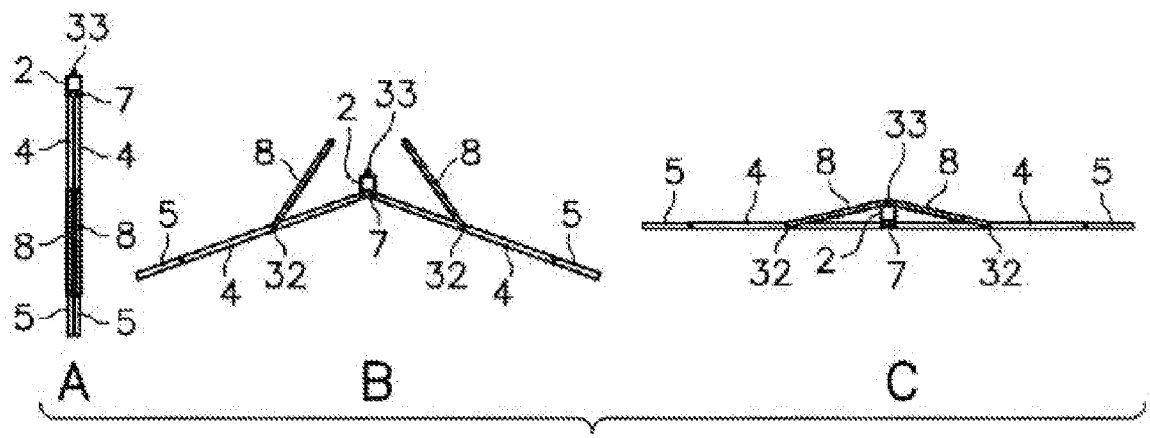
FIGS. 12 A, B, C are front views illustrating the connection of rib members and solar panels to the spine section in cooperation with locking means in A) the folded position, B) an intermediate position between the folded position and the deployed position, and C) the deployed position, respectively, according to another embodiment.
Figure 13:
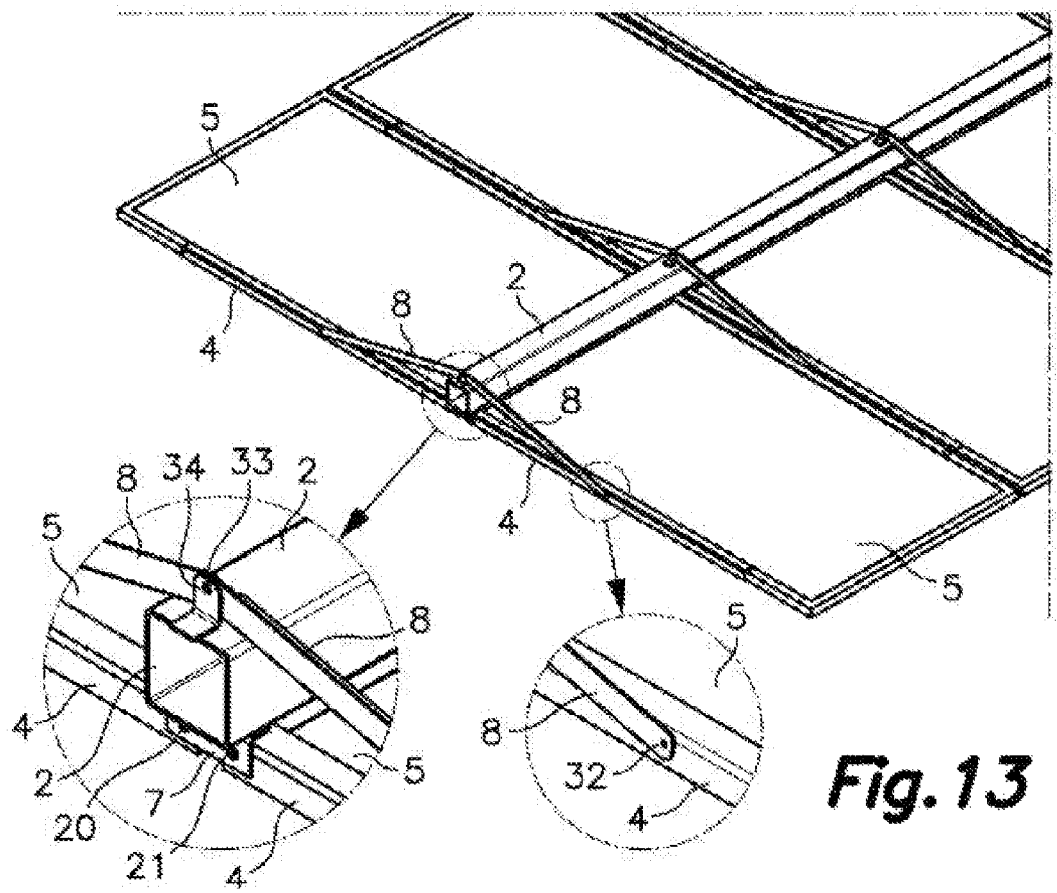
FIG. 13 is a perspective view illustrating the locking means of FIGS. 12 A, B, C locking the rib members and solar panels to the spine section in the deployed position, with enlarged details.

FIGS. 12 A, B, C and 13 show an alternative embodiment for the locking means. Here, the locking means comprise pairs of truss members 8 having opposite ends connected to the rib members 4 by pins 32 and adjacent ends connected to an auxiliary bracket 33 located at one side of the spine section 2 opposite the support surface by a common pin 34 or by respective pins. Alternatively, the auxiliary bracket 33 and corresponding pin 34 can be omitted and the adjacent ends of the pairs of truss members 8 can be connected to one another by a connecting part resting on the mentioned side of the spine section 2 opposite the support surface, or even the pairs of truss members 8 can be integrated in a single piece member having an angled shape.

Figure 14:
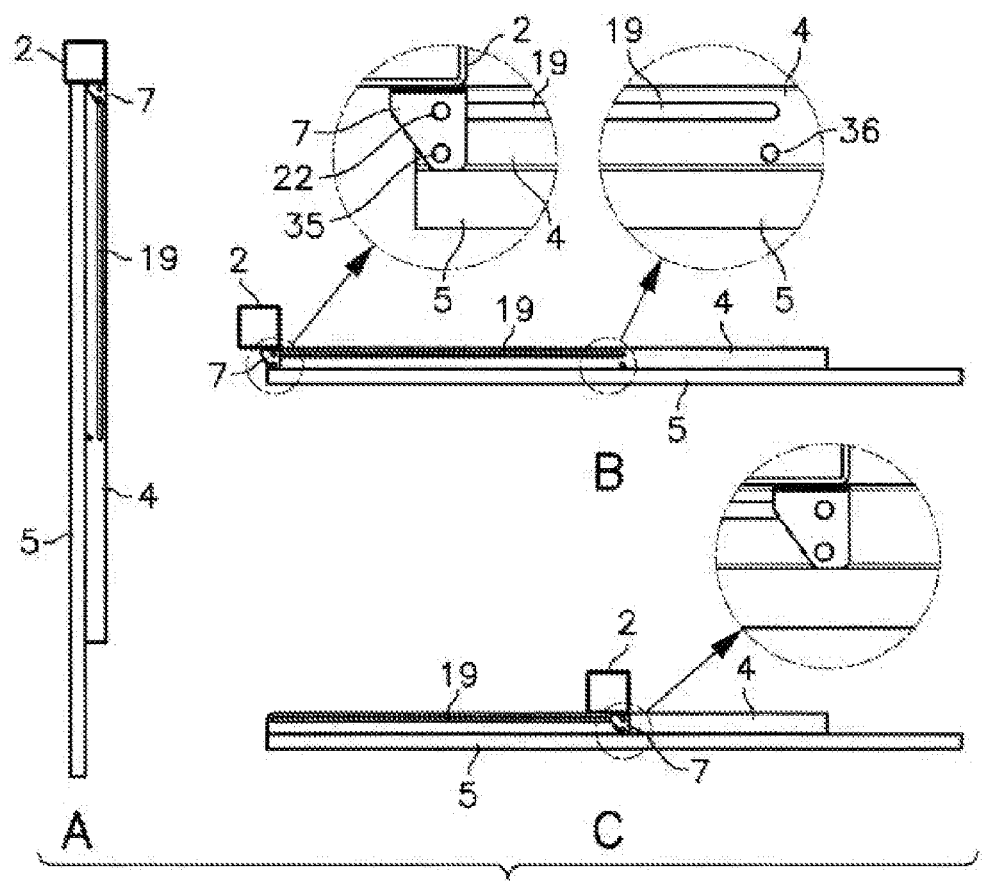
FIGS. 14 A, B, C are front views illustrating the connection of rib members and solar panels to the spine section in cooperation with locking means in A) the folded position, B) an intermediate position between the folded position and the deployed position, with enlarged details, and C) the deployed position, with an enlarged detail illustrating locking means locking the rib member and solar panel to the spine section, respectively, according to another embodiment.

FIGS. 14 A, B, C and 15 show an alternative construction for the connection of the rib members 4 and solar panels 5 to the spine sections 2. Here, the brackets 7 attached to the spine sections 2 have a hole which defines a single longitudinal hinge 22 parallel to the longitudinal rotation axis 15 of the spine section 2, and the single rib members 4 are connected to the brackets 7 by rotating and sliding means which comprise a guide element 19 provided in the rib member 4 in a position parallel thereto and a guide follower connected to the bracket 7 by the single longitudinal hinge 22. In the embodiment shown, the guide element 19 comprises a slot formed in the rib member 4 and the guide follower comprises a pin inserted both in the slot constituting the guide element 19 of the rib member 4 and in the hole of the bracket 7 defining the single longitudinal hinge 22. The guide element 19 has one end adjacent to an end of the rib member 4.

Single solar panels 5 are secured to the rib members 4, with one end edge of the solar panel 5 being located adjacent to the end of the rib member 4 which in turn is adjacent to one end of the guide element 19. In the folded position (FIG. 14A), the guide follower is at the mentioned one end of the guide element 19 and the single solar panel 5 is completely off set with respect to the spine section 2 and hanging by gravity from the brackets 7. In an intermediate position (Fig. B), the rib member 4 together with the single solar panel 5 simply has been rotated 90 degrees about the single longitudinal hinge 22 provided by the guide follower without sliding motion. In the deployed position (FIGS. 14C and 15) the rib member 4 together with the single solar panel 5 has been sled with respect to the spine section 2 by means of the guide follower running along the guide element 19 to the other end thereof, in which position the solar panel 5 is centred with respect to the spine section 2 extending equal distances at both ends thereof.

Figure 15:
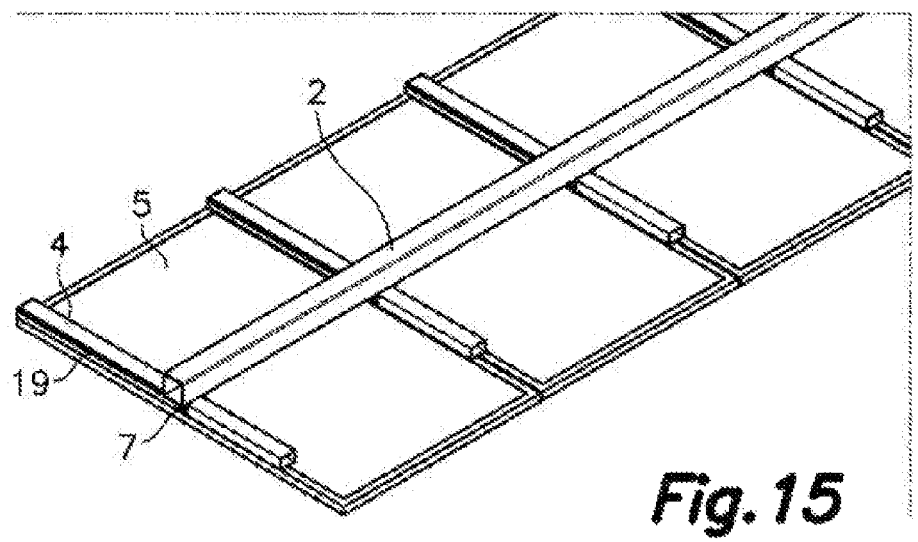
FIG. 15 is a perspective view illustrating the solar tracker of FIGS. 14 A, B, C in the deployed position.

Locking means are also provided for locking the single rib members 4 to the spine section 2 in the deployed position. Such locking means comprise a first locking hole 35 formed in the bracket 7 and a second locking hole 36 formed in the rib member 4. The first and second locking holes 35, 36 are positioned so that they are mutually aligned when the rib member 4 together with the single solar panel 5 are in the deployed position (FIGS. 14C and 15). A locking pin (not shown) is inserted in the mutually aligned first and second locking holes 35, 36 to lock the single rib member 4 to the spine section 2 in the deployed position.

Figure 16:
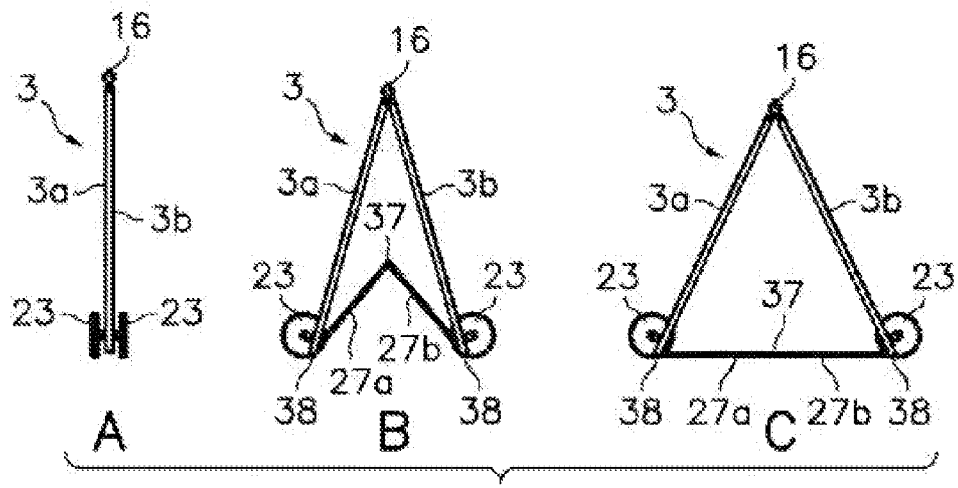
FIGS. 16 A, B, C are front views illustrating a supporting leg according to another embodiment in A) a contracted position, B) an intermediate position between the contracted position and an expanded position, and B) the expanded position, respectively.
Figure 17:
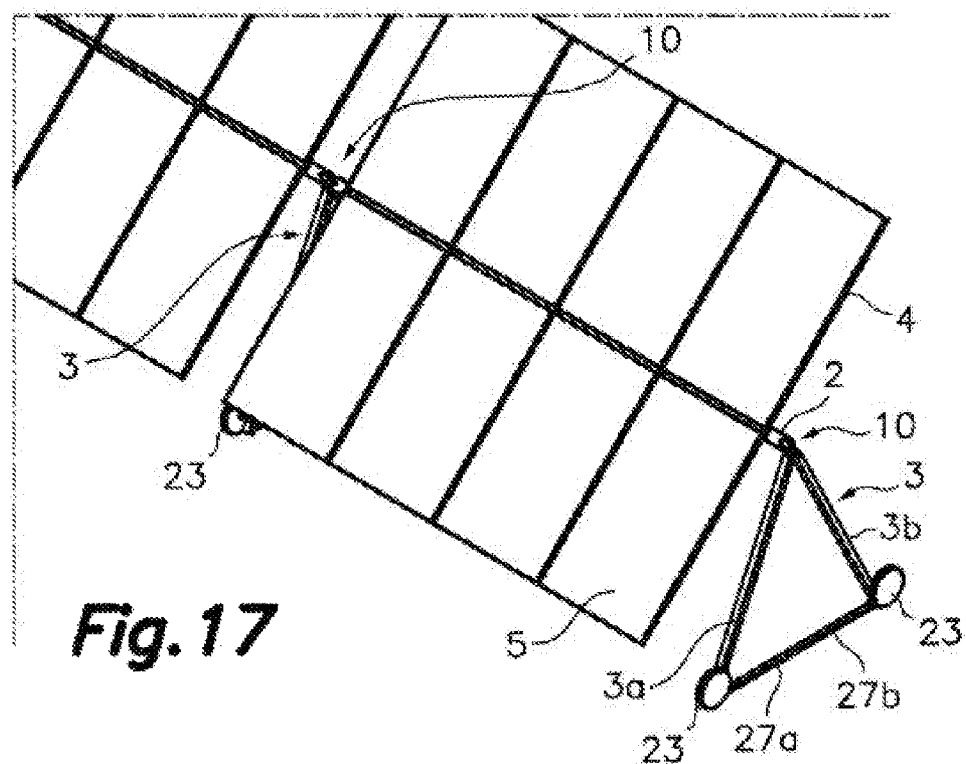
FIG. 17 is a perspective view of a single axis solar tracking assembly comprising the supporting leg of FIGS. 16 A, B, C.

FIGS. 16 A, B, C and 17 show an alternative embodiment for the supporting legs 3, where the supporting leg 3 comprises two leg members 3 *a*, 3 *b* hinged to one another at their upper ends, for example by means of the auxiliary shaft 16, and two base members 27 *a*, 27 *b* having respective adjacent ends hinged to one another by a hinge pin 37 and respective opposite ends hinged to lower ends of the two leg members 3 *a*, 3 *b* by hinge pins 38. This alternative supporting leg 3 can be folded into a folded position (FIG. 16A), in which the two leg members 3 *a*, 3 *b* and the two base members 27 *a*, 27 *b* are parallel to one another, and an unfolded position (FIG. 16C), in which the lower ends of the two leg members 3 *a*, 3 *b* are spaced apart and the two base members 27 *a*, 27 *b* are aligned, thus constituting a foldable triangle the base of which is oriented perpendicular to the auxiliary shaft 16 and perpendicular or near to perpendicular to the spine sections 2 when the spine sections 2 (FIG. 17). Friction reducing elements are provided at lower ends of the two leg members 3 *a*, 3 *b*. In the embodiment shown, the friction reducing elements are wheels 23, although sleds are also possible.

FIGS. 18 A, B, C show an optional connection of the wheels 23 to the supporting legs 3, where the wheel 23 is rotatably mounted on a movable support 24, and the movable support 24 is connected to the corresponding leg member 3 *a*, 3 *b* by a hinge 25 parallel to a longitudinal direction of the leg member 3 *a*, 3 *b*. Thus, by pivoting the movable support 24 about the hinge 25 the wheel 23 can be arranged at a first side of the leg member 3 *a*, 3 *b* (FIG. 18A), at a second side of the leg member 3 *a*, 3 *b* (FIG. 18C), and at any intermediate position (FIG. 18B). The connection of the wheel 23 to the supporting leg 3 shown in FIGS. 18 A, B, C is also applicable to a supporting leg 3 comprising a single post, with the hinge 25 being parallel to a longitudinal direction of the single post.

FIGS. 19 to 23 show different examples of anchoring means that can be used for anchoring the supporting legs 3 to the ground.

In FIG. 19 the supporting leg 3 comprises a single post having a perpendicular plate, such as a sled 26, attached at its lower end, and the anchoring means comprise a pilot 30 embedded in the ground and provided with a perpendicular connection plate 39 attached at its upper end which is flush with the ground level. The sled 26 is connected to the connection plate 39 by fastening elements, such as for example bolts 40.

In FIG. 20 the supporting leg 3 has the foldable triangular configuration described above in connection with FIGS. 16 A, B, C and 17, and the anchoring means comprise a pilot 30 embedded in the ground. A clamp element 41 attached to an upper end of the pilot 30 engages adjacent end portions of the two base members 27 *a*, 27 *b* where the hinge pin connecting the two base members 27 *a*, 27 *b* to one another is located and presses them against the ground.

Figure 21:
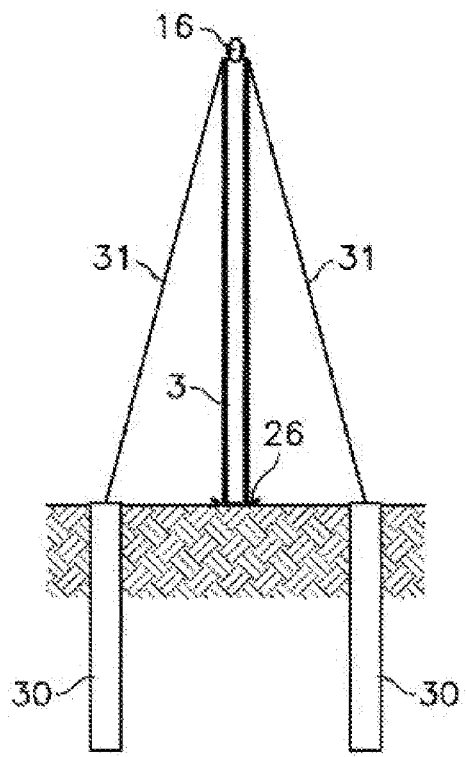
FIG. 21 is a side view illustrating anchoring means anchoring a single post supporting leg to the ground according to another embodiment including ground pilots and guy wires.

In FIG. 21 the supporting leg 3 comprises a single post having a sled 26 attached at its lower end, and the anchoring means comprise guy wires 31 cooperating with two pilots embedded in the ground. The two pilots 30 are spaced apart from one another and the single post supporting leg 3 is located between them. The guy wires 31 have respective upper ends connected to opposite sides of the single post supporting leg 3 and respective lower ends connected to the pilots 30.

Figure 22:
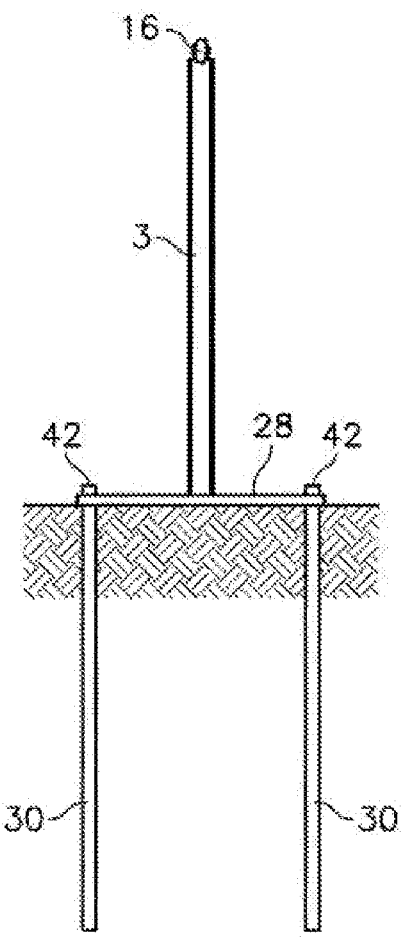
FIG. 22 is a side view illustrating anchoring means anchoring a single post supporting leg to the ground according to an embodiment including a transverse base and ground pilots.

In FIG. 22 the supporting leg 3 comprises a single post having a perpendicular transverse base 28 attached to a lower end thereof, and the anchoring means comprise two pilots embedded in the ground. The transverse base 28 extends equal distances from opposite sides of the single post supporting leg 3 and the two pilots 30 are spaced apart from one another a distance slightly shorter than a longitudinal length of the transverse base 28. opposite ends of the transverse base 28 are connected to upper ends of the pilots 30 by fastening elements, such as for example bolts 42.

Figure 23:
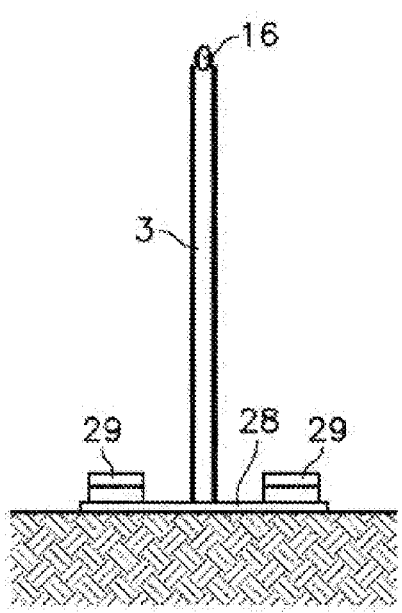
FIG. 23 is a side view illustrating anchoring means anchoring a single post supporting leg to the ground according to an embodiment including a transverse base and counterweights.

In FIG. 23 the supporting leg 3 comprises a single post having a perpendicular transverse base 28 attached to a lower end thereof as described above in relation with FIG. 22, and the anchoring means comprise counterweights 29 resting on opposite distal portion of the transverse base 28. The counterweights 29 press the transverse base 28 against the ground.

Preferably, the transverse base 28 as described in relation to either FIG. 22 or FIG. 23 comprises two foldable transverse base elements (not shown) hinged to the single post so that the supporting leg 3 can be folded into a folded position in which the single post supporting leg 3 and the two transverse base elements of the transverse base 28 are adjacent mutually parallel.

The scope of the present invention is defined in the attached claims.

The invention claimed is:

1. A single axis solar tracking assembly comprising:
a spine having a plurality of spine sections connected to one another by universal joints, each spine section having a longitudinal rotation axis;
supporting legs rotatably supporting said spine sections on the ground;
a plurality of brackets attached to each of the spine sections;
a plurality of rib members connected to said brackets; and
at least one solar panel secured to each of said rib members, said at least one solar panel having a solar radiation collecting surface;
wherein the rib members together with said at least one solar panel are moveable with respect to the spine sections between a folded position and a deployed position;
wherein an auxiliary shaft is located between adjacent universal joints connected to adjacent ends of two adjacent spine sections;
wherein each of said universal joints comprises a cross member defining perpendicularly crossed first and second spine hinge axes, a first yoke rigidly attached to one end of one of the spine sections and connected to said cross member to rotate about said first spine hinge axis, and a second yoke rigidly attached to one end of said auxiliary shaft and connected to the cross member to rotate about said second spine hinge axis, and wherein one of the first and second spine hinge axes of the cross member of each universal joint is parallel and the other is perpendicular to said solar radiation collecting surface of the at least one solar panel when the solar tracking assembly is in an intermediate position in which the rib members together with the solar panels are in said folded position and said longitudinal rotation axis of the spine sections is aligned or near to aligned with the auxiliary shaft, thereby each spine section is foldable at right angles with respect to the auxiliary shaft and the plurality of spine sections are foldable in a zig zag fashion from said intermediate position into a compact storage position in which solar radiation collecting surfaces, comprising the solar radiation collecting surface of the at least one solar panel secured to each of the rib members, are arranged in adjacent parallel planes.

2. The single axis solar tracking assembly according to claim 1, wherein the auxiliary shaft is operatively connected to an electric motor to be rotated by said electric motor.

3. The single axis solar tracking assembly according to claim 1, wherein at least one of said supporting legs is located between adjacent ends of two adjacent spine sections and one of said auxiliary shafts is rotatably supported on the at least one supporting leg which is located between adjacent ends of two adjacent spine sections.

4. The single axis solar tracking assembly according to claim 3, wherein an electric motor is secured to the at least one supporting leg which is located between adjacent ends of two adjacent spine sections and the auxiliary shaft is an output shaft of said electric motor protruding from opposite sides of the electric motor.

5. The single axis solar tracking assembly according to claim 1, wherein a bearing is supported by at least one of said supporting legs, an end of one of the spine sections is rotatably supported by said bearing, and a tilt hinge providing a tilting axis perpendicular to the longitudinal rotation axis of the spine section is provided between the bearing and the supporting legs.

6. The single axis solar tracking assembly according to claim 1, wherein the spine sections have a support surface encompassed in a dihedral angle of 120 degrees or less with respect to said longitudinal rotation axis of the spine section, and the brackets are located on said support surface.

7. The single axis solar tracking assembly according to claim 6, wherein the support surface of the spine sections is facing downwards and the rib members together with the solar panels are hanging vertically by gravity from said brackets in the folded position.

8. The single axis solar tracking assembly according to claim 6, wherein the rib members are connected to the brackets by at least one longitudinal hinge parallel to said longitudinal rotation axis of the spine section.

9. The single axis solar tracking assembly according to claim 8, wherein pairs of opposing rib members are connected to the brackets by said at least one longitudinal hinge, and pairs of solar panels are respectively secured to said pairs of opposing rib members, wherein said pairs of solar panels are adjacent and facing to each other in the folded position and are mutually coplanar extending from opposite sides of the spine section in said deployed position.

10. The single axis solar tracking assembly according to claim 7, wherein said opposing rib members are rigidly attached to mutually meshed gear elements that cause the opposing rib members to move symmetrically with respect to the spine section between the folded and deployed positions.

11. The single axis solar tracking assembly according to claim 9, wherein locking arrangement is provided for locking the rib members to the spine sections in the deployed position, said locking arrangement comprising truss members connected to the rib members and to one side of the spine section opposite the support surface, or clamp elements secured to the spine section by fastening elements, said clamp elements pressing on portions of each pair of rib members and against the support surface of the spine section.

12. The single axis solar tracking assembly according to claim 8, wherein the rib members comprise single rib members which are connected to the brackets by rotating and sliding elements comprising a guide element provided in the rib member parallel thereto and a guide follower coupled to the guide element and connected to the bracket, wherein said at least one longitudinal hinge comprises a single longitudinal hinge which connects said guide follower to the bracket, and wherein a single solar panel or a group of solar panels is secured to each of the rib members, the single solar panels or groups of solar panels being completely off set with respect to the spine section in the folded position and centered with respect to the spine section in the deployed position.

13. The single axis solar tracking assembly according to claim 12, wherein locking elements are provided for locking the single rib members to the spine section in the deployed position.

14. The single axis solar tracking assembly according to claim 1, wherein at least one of the supporting legs comprises a single post.

15. The single axis solar tracking assembly according to claim 14, wherein at least one friction reducing element is provided at a lower end of said single post comprised in the supporting leg, said at least one friction reducing element being selected from a group comprising wheels and sleds.

16. The single axis solar tracking assembly according to claim 15, wherein at least one of said wheels is rotatably mounted on a movable support, and said movable support is connected to the single post comprised in the supporting legs by a hinge parallel to a longitudinal direction of the single post.

17. The single axis solar tracking assembly according to claim 14, wherein a transverse base is attached to a lower end of said single post comprised in the supporting leg, said transverse base extending perpendicular to the single post from opposite sides of the single post and comprising two foldable transverse base elements hinged to the single post.

18. The single axis solar tracking assembly according to claim 1, wherein at least one supporting leg comprises two leg members hinged to one another at their upper ends and two base members having respective adjacent ends hinged to one another and respective opposite ends hinged to lower ends of said two leg members, the two leg members and the two base members being movable between a folded position and an unfolded position.

19. The single axis solar tracking assembly according to claim 18, wherein friction reducing elements are provided at lower ends of said two leg members, said friction reducing elements being selected from a group consisting of wheels and sleds.

20. The single axis solar tracking assembly according to claim 19, wherein said wheels are rotatably mounted on respective movable supports, and each of said movable supports is connected to one of the two leg members by a hinge parallel to a longitudinal direction of the leg member.

* * * * *